US008156501B2

(12) United States Patent
Branson et al.

(10) Patent No.: US 8,156,501 B2
(45) Date of Patent: Apr. 10, 2012

(54) IMPLEMENTING DYNAMIC AUTHORITY TO PERFORM TASKS ON A RESOURCE

(75) Inventors: Michael John Branson, Rochester, MN (US); Gregory Richard Hintermeister, Rochester, MN (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1200 days.

(21) Appl. No.: 11/553,538

(22) Filed: Oct. 27, 2006

(65) Prior Publication Data

US 2008/0104603 A1    May 1, 2008

(51) Int. Cl.
*G06F 9/46*      (2006.01)
*G06F 3/01*      (2006.01)
(52) U.S. Cl. ........................................ 718/104; 715/701
(58) Field of Classification Search .................. None
See application file for complete search history.

(56) References Cited

U.S. PATENT DOCUMENTS

| 7,401,137 | B1 * | 7/2008 | Gasser et al. ............... 709/223 |
| 7,580,933 | B2 * | 8/2009 | Johnson et al. ............... 1/1 |
| 2002/0004814 | A1 * | 1/2002 | Tanaka ........................ 709/201 |
| 2003/0200412 | A1 * | 10/2003 | Peinado et al. ............... 711/202 |
| 2004/0064458 | A1 * | 4/2004 | Hagarty ........................ 707/100 |

\* cited by examiner

*Primary Examiner* — Camquy Truong
(74) *Attorney, Agent, or Firm* — Joan Pennington

(57) ABSTRACT

A method, apparatus and computer program product implement dynamic authority for a user to perform tasks on a resource. A user selected task on a resource is identified and analyzed to determine whether the task changes a state of the resource. When determined that the task changes a state of the resource, then a relationship of the resource to related resources is analyzed. Access to tasks on the resource is dynamically determined for the user based upon the identified relationship of the resource to related resources. Based on the analysis performed, access is denied or a summary of side effects with confirmation is presented.

18 Claims, 7 Drawing Sheets

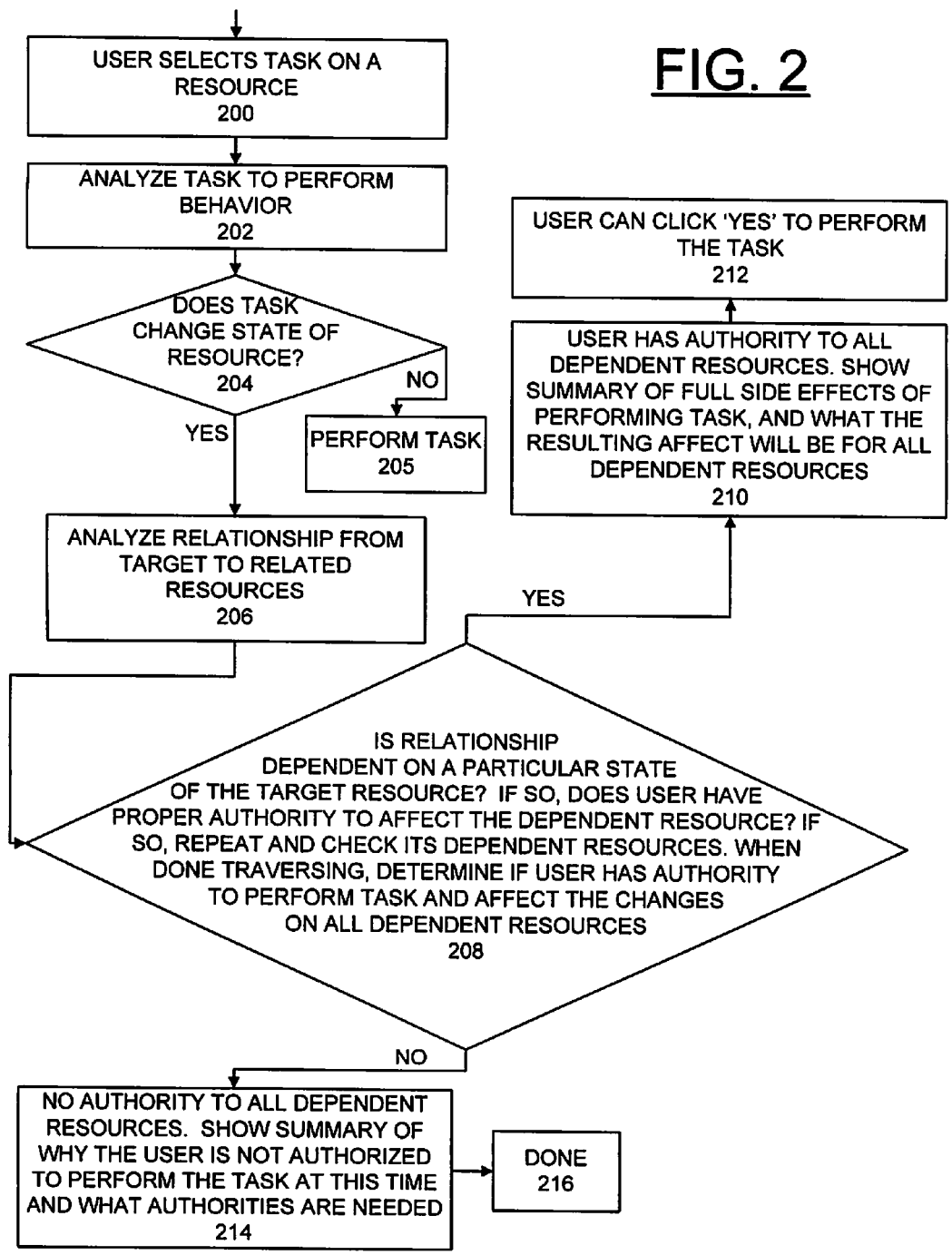

IMPLEMENTING DYNAMIC AUTHORITY TO PERFORM TASKS ON A RESOURCE

FIELD OF THE INVENTION

The present invention relates generally to the data processing field, and more particularly, relates to a method, apparatus and computer program product for implementing dynamic authority to perform tasks on a resource based upon, for example, impact to related resources, relationships, and side-effects of the tasks.

DESCRIPTION OF THE RELATED ART

In modern information technology (IT) environments, generally every resource has relationships to other resources. When tasks are performed on these resources, the outcome may affect other resources through these relationships.

For example, if a storage volume is put in maintenance mode, it may affect a web store-front that customers are using because the storage volume is where the data is stored. If the storage volume is in maintenance mode, the web store-front may experience poor performance of the data access and storage.

Two significant problems in these environments are:

Firstly, an administrator does not always know the side effects that the task will have to related resources.

Secondly, currently there is no way to control access to a task based upon what the resource is related to, and how severe the side effects may be. Access to tasks on the storage volume today is limited to the volume itself, or the storage system to which the volume belongs. Known arrangements only ask, "Does an administrator have access to perform a task on this resource?" It does not take into account what that resource is related to, and how critical that related resource is and what the side effects of the task will be.

A need exists for a method that authorizes a user based upon the relationships between resources, so that when performing a task on one of the resources, its relationships are explored, and access to its tasks are granted or revoked based on the importance and potential impact of those relationships and related resources. A need exists for a method to explore the side effects of a task to targeted and related resources and relationships. It is highly desirable to provide a summary of side effects when authority is granted.

SUMMARY OF THE INVENTION

Principal aspects of the present invention are to provide a method, apparatus and computer program product for implementing dynamic authority to perform tasks on a resource. Other important aspects of the present invention are to provide such method, apparatus and computer program product for implementing dynamic authority to perform tasks on a resource substantially without negative effect and that overcome many of the disadvantages of prior art arrangements.

In brief, a method, apparatus and computer program product are provided for implementing dynamic authority to perform tasks on a resource. A user selected task on a resource is identified and analyzed to determine whether the task changes a state of the resource. When determined that the task changes a state of the resource, then a relationship of the resource to at least one related resource is analyzed. Access to tasks on the resource is dynamically determined for the user based upon the identified relationship of the resource to the at least one related resource.

In accordance with features of the invention, based on the analysis performed, access is denied or a summary of side effects with confirmation is presented. When the task does not change a state of the resource, then the task is performed without additional analysis. Analysis of the relationship of the resource to related resources includes determining whether the relationship is dependent on a particular state of the target resource. When the relationship is dependent on a particular state of the target resource, checking for user authority to change the related resource. When the user has authority to change the related resource, then checking for authority to change other dependent resources. When the user has authority to change another dependent resource, then a warning summary is displayed for the user. The warning summary shows at least one relationship that is affected by the task and what the resulting affect is for the dependent resource. When the user lacks authority to change another dependent resource, then a summary for the lack of authority to perform the task is displayed.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a flow chart illustrating exemplary steps for implementing dynamic authority to tasks in accordance with the preferred embodiment;

DETAILED DESCRIPTION OF THE PREFERRED EMBODIMENTS

In accordance with features of the preferred embodiments, a method is provided to dynamically control access to tasks on a resource based on its relationships to other resources. For example, a result is that an administrator may have authorization to perform Task A on Resource 1, but if Task A impacts Resource 2, based upon the type of relationship and the type of task, then Task A will be revoked for that administrator. If the administrator still has access to the task, the method of the invention then shows the related resources to further communicate the full side effects this task will have in the environment. It is important to note that even with standard object level authorization, with the method of the invention the administrator may be able to perform a task one day and not be able to perform the task the next day because of a relationship/dependency that was added. The behavior is dynamic. Nothing needs to be set up in order for an administrator's effective authorization to change.

Figure 1A:
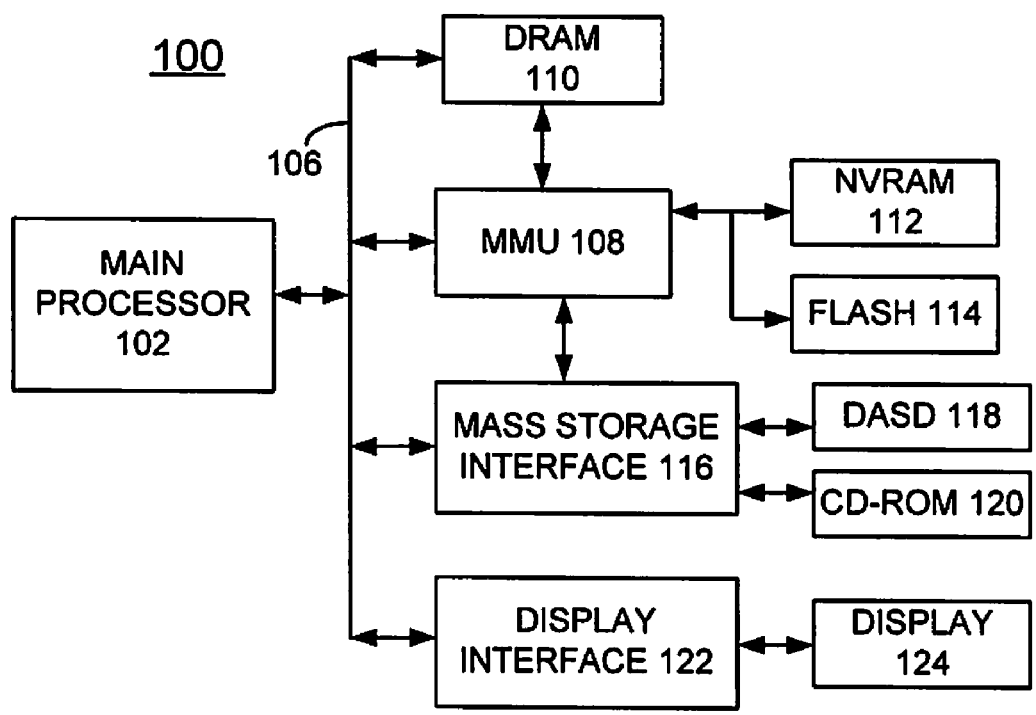
FIGS. 1A and 1B are block diagram representations illustrating an exemplary computer system and operating system for implementing dynamic authority to tasks in accordance with the preferred embodiment.
Figure 1B:
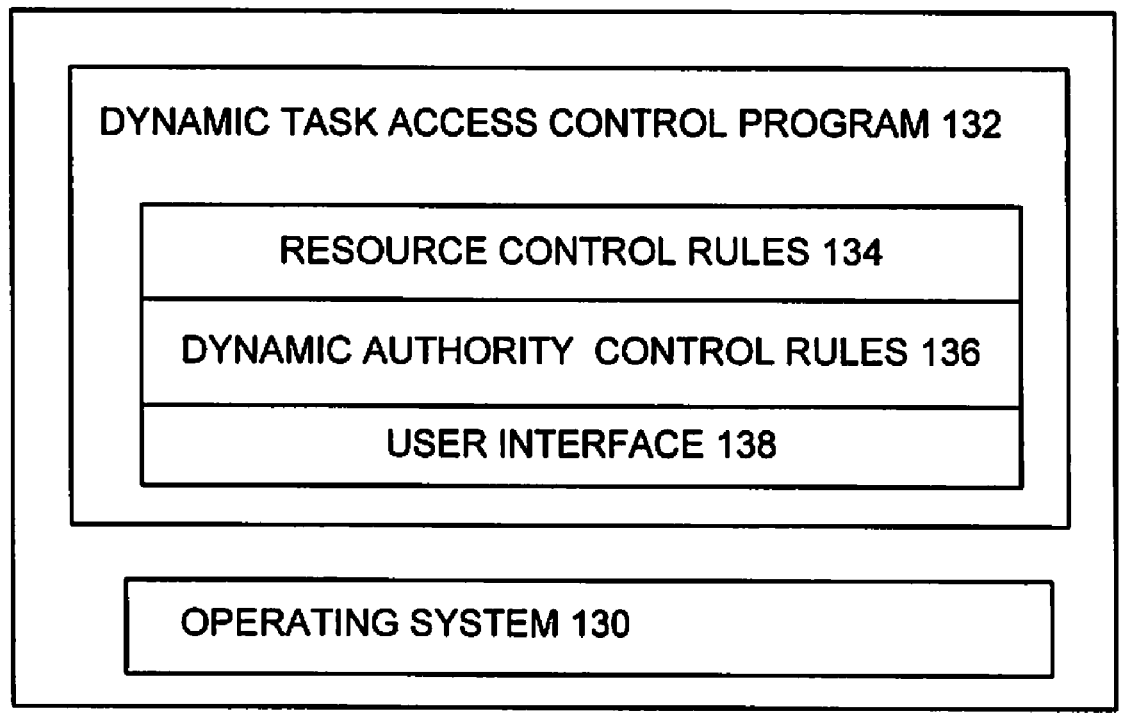

Having reference now to the drawings, in FIGS. 1A and 1B, there is shown an exemplary server or computer system generally designated by the reference character 100 for implementing methods for dynamically controlling access to tasks or implementing dynamic authority to tasks in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 1B, computer system 100 includes an operating system 130, a dynamic task access control program 132 of the preferred embodiment, resource control rules 134 and dynamic authority control rules 136 of the preferred embodiment, and a user interface 138. Resource control rules 134 and dynamic authority control rules 136 are identified and stored in accordance with methods for implementing dynamic authority to tasks in accordance with the preferred embodiment.

Various commercially available computers can be used for computer system 100, for example, an IBM personal computer or an IBM server computer, such as an IBM System p™ server computer. CPU 102 is suitably programmed by the dynamic task access control program 132 to execute the flowchart of FIG. 2 for implementing methods for dynamic authority to tasks and generating exemplary displays of FIGS. 3, 4, and 5 in accordance with the preferred embodiment.

Referring to FIG. 2, there are shown exemplary steps for implementing dynamic authority to tasks in accordance with the preferred embodiment. As indicated in a block 200, a user selects a task on a resource.

Figure 3:
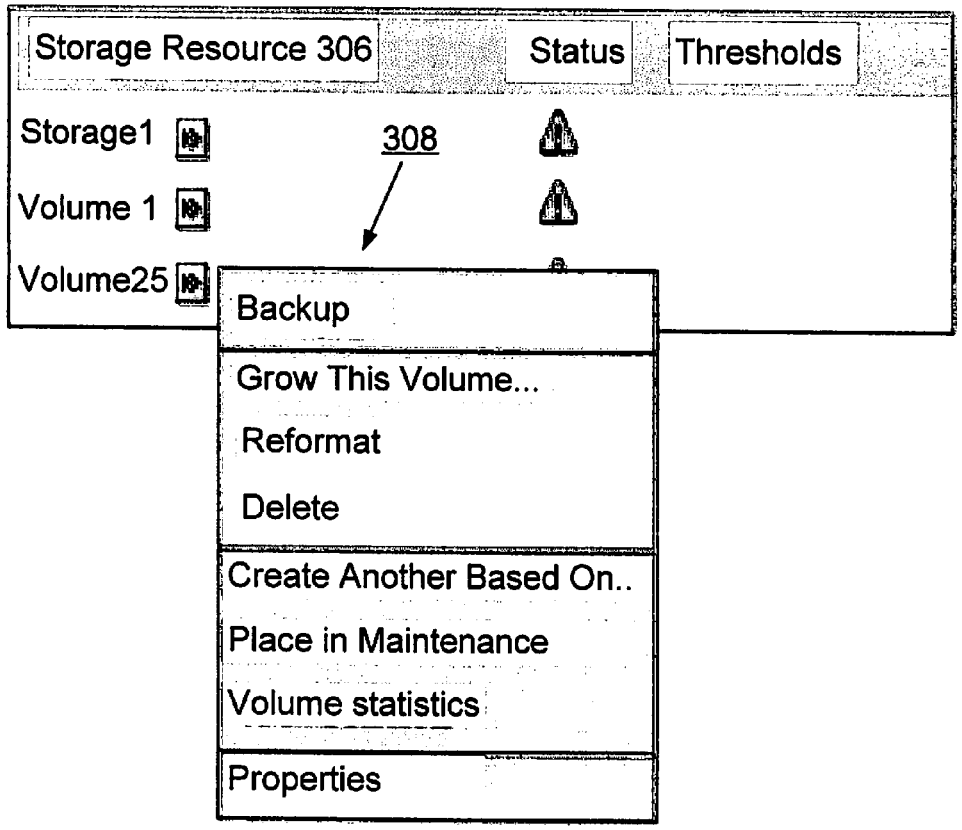
FIGS. 3, 4, and 5 illustrate exemplary displays for implementing dynamic authority to tasks in accordance with the preferred embodiment.
Figure 4:
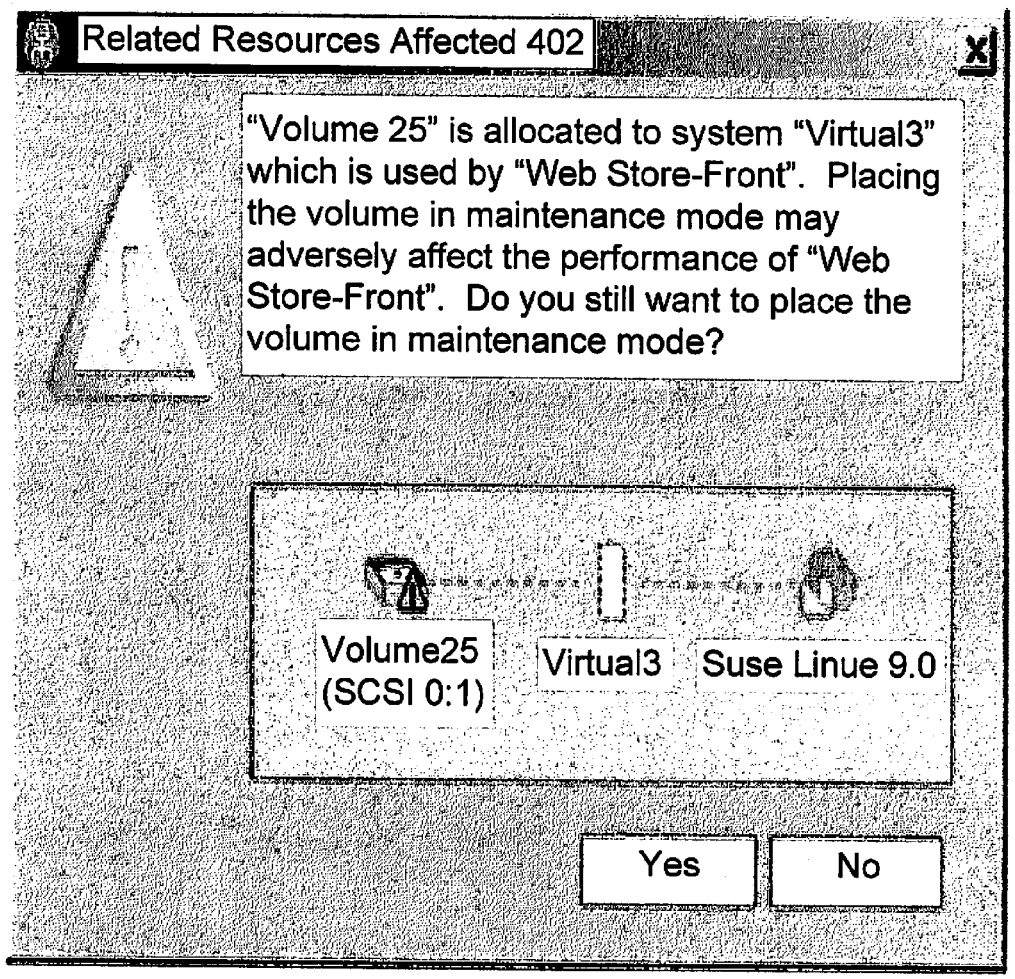
Figure 5:
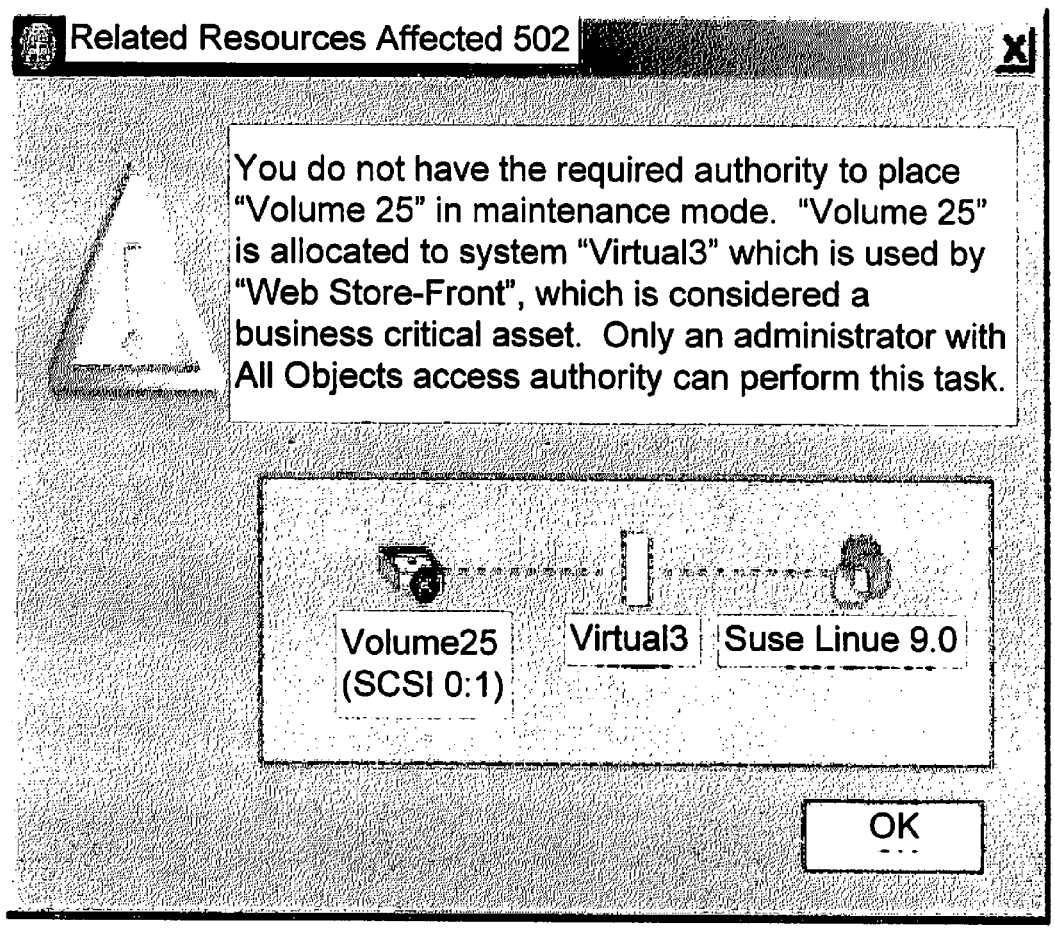

Referring also to FIGS. 3, 4, and 5, there are shown exemplary displays for implementing dynamic authority to tasks in accordance with the preferred embodiment.

In FIG. 3, an exemplary display generally designated by the reference character 300 for implementing dynamic authority to tasks in accordance with the preferred embodiment. Display 300 includes user selection options for storage, most critical 302 and a view all storage 304. Display 300 includes storage resource 306 together with status and threshold. As shown, storage resource 306 includes Storage 1, Volume 1, and Volume 25. Display 300 illustrates a context menu 308 for Volume 25.

The user can select any task from the menu 308. While some tasks would have a bigger impact on the resources related to Volume 25. Obviously, deleting or placing the volume in maintenance mode will have the biggest impact on any resources like a server that use that storage volume.

When a user signs on to system 100, the user has certain authorities to resources and tasks. When the user selects a context menu 308 on a resource 306, the methods for implementing dynamic authority to tasks is activated. Optionally the method for implementing dynamic authority to tasks could be done ahead of time to increase perceived performance or disable the menu items ahead of time.

As indicated in a block 202, the computer-implemented method analyzes the task the user selects. Checking whether the task changes the state of the resource is performed as indicated in a decision block 204. Simple tasks, such as read-only tasks on resources, do not have side effects on other resources, so for read-only tasks, no additional analysis is performed, and the task is performed as indicated in a block 205. Tasks that change the resource, state or otherwise, are analyzed further as indicated in a block 206. In these cases, the relationships from the resource to other resources are analyzed at block 206.

In accordance with features of the invention, analysis at block 202 advantageously is selectively based upon weights of how destructive the task is, by recording the history of past times the task is run, or by a simple "Yes/No" knowledge provided by the task.

In accordance with features of the invention, dynamic authority for a task is selectively determined by:

1). The resources it is related to or the dependent resources for the task.

2). The authority the user has to the selected resource, as well as the dependent or related resources.

3). What the resource does, and what the related resources do.

4). The relative importance of specific resources or groups of resources. The more important those resources or groups are rated, the more sensitive they are to change. Ultimately resources that are rated as very important would require high levels of authority to change it, or anything closely related to it.

5). The type of relationship it has to the resource. Resources that are related through a simple group would not be impacted as much as a resource that is related because it uses or depends on the resource the user is changing.

6). What the task will do to the resource or relationship. Destructive tasks are taken more seriously than other, more simple tasks.

As indicated in a decision block 208, if the relationships indicate a dependency on the state of the resource by another resource, then authorization checks are made to see if the user has the necessary rights to change the dependent resource. If so, this process is repeated for the dependent resource. Its relationships are explored to look for other side effects and to ensure that the user has the necessary rights to cause them. If the user has the authority, a confirmation dialog appears showing the relationships that will be affected and in what ways as indicated in a block 210.

Referring also to FIG. 4, an exemplary display generally designated by the reference character 400 for implementing dynamic authority to tasks in accordance with the preferred embodiment. Display 400 includes related resources affected 402 and confirmation dialog appears showing the relationships that will be affected and in what ways.

Display 400 illustrates a warning dialog when the user has the authority to complete the task. The message states what resources the storage volume is related to and how the related resource may be affected. Display 400 also illustrates a small topology map illustrating how the resources are related. The message dialog provides a Yes and No button so the user can proceed with the task or not. As indicated in a block 212, the user can click 'YES' to perform the task. Display 400 can also be hidden based on a customer setting.

As indicated in a block 214, if the user does not have authority based on the related resources and types of relationships, then an error message will appear showing the resources, relationships, and why the user cannot perform the task. As indicated at a block 216, then the operations are done.

Referring also to FIG. 5, an exemplary display generally designated by the reference character 500 for implementing dynamic authority to tasks in accordance with the preferred embodiment. Display 500 includes related resources affected 502 and a warning dialog when the user does not have the correct authority to perform the task. The message states that the user does not have the correct authority to perform the task. The message also states what other resources the volume that was selected is related to and what authority is needed to actually perform the task. Display 500 also illustrates a small topology map illustrating how the resources are related. The message dialog display 400 provides an OK button for the user to confirm and close the message.

Figure 6:
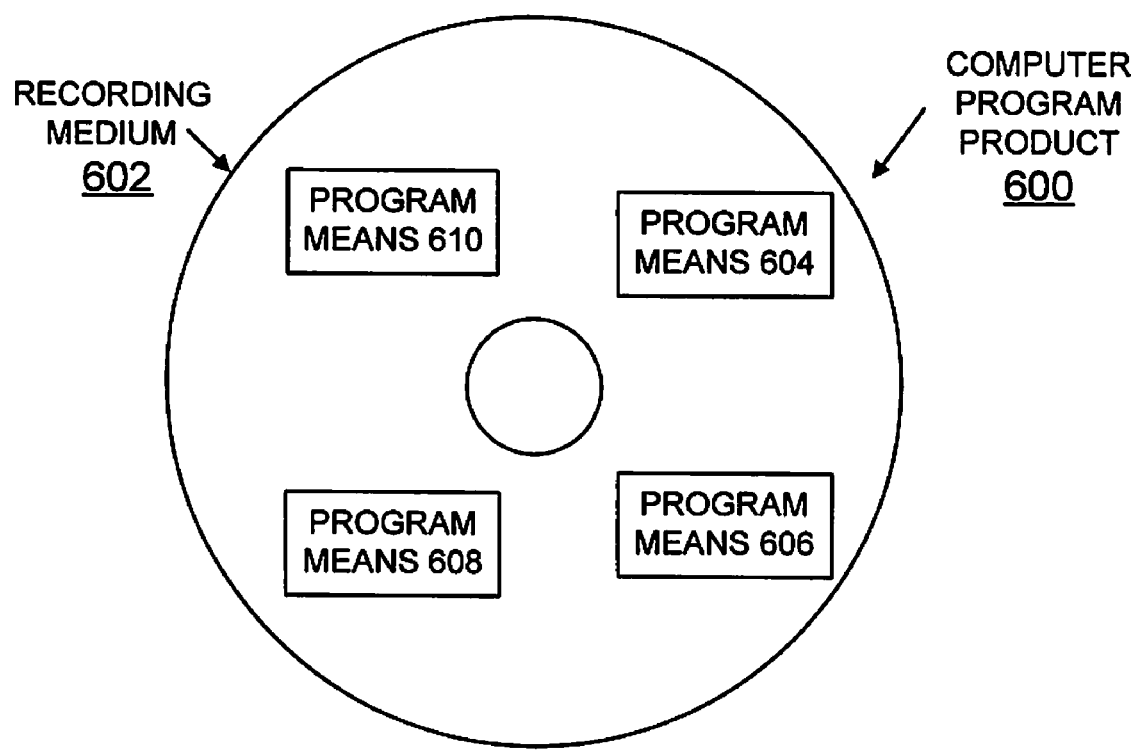
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing dynamic authority to tasks of the preferred embodiment in the system 100 of FIGS. 1A and 1B.

A sequence of program instructions or a logical assembly of one or more interrelated modules defined by the recorded program means 604, 606, 608, 610, direct the computer system 100 for carrying out the methods for implementing dynamic authority to tasks of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A computer-implemented method for implementing dynamic authority to perform tasks on a target resource comprising:
    identifying and analyzing a user selected task of the tasks on a target resource to determine whether the user selected task changes a state of the target resource;
    responsive to determining the user selected task changes a state of the target resource, analyzing a relationship of the target resource to at least one related resource; said analyzed relationship of the target resource to the at least one related resource implementing dynamic authority to the user selected task and being selectively based upon destructive weights of the user selected task of the target resource to the at least one related resource; said destructive weights of the user selected task of the target resource to the at least one related resource being selectively based upon recording a history of past times the selected task is run;
    dynamically determining access to perform the user selected task on the target resource for the user based upon the analyzed relationship of the target resource to the at least one related resource;
    displaying a warning summary for the user when determined the user has authority to change the target resource; and
    the warning summary displaying dialog of an affect resulting from performing the user selected task on the target resource and the at least one related resource;
    performing the user selected task on the target resource.

2. A computer-implemented method for implementing dynamic authority as recited in claim 1 includes performing the user selected task, responsive to determining the user selected task does not change a state of the target resource.

3. A computer-implemented method for implementing dynamic authority as recited in claim 1 wherein dynamically determining access to perform the user selected task on the target resource includes analyzing a relationship of the target resource to a plurality of related resources.

4. A computer-implemented method for implementing dynamic authority as recited in claim 1 wherein dynamically determining access to perform the user selected task on the target resource includes identifying whether the analyzed relationship of the target resource to the at least one related resource is related to a particular state of the target resource.

5. A computer-implemented method for implementing dynamic authority as recited in claim 4 includes checking for user authority to affect change of the at least one related resource.

6. A computer-implemented method for implementing dynamic authority as recited in claim 1 wherein the warning summary displays relationship between the target resource and the at least one related resource.

7. A computer-implemented method for implementing dynamic authority as recited in claim 1 includes responsive to the user lacking authority to change another dependent resource, displaying a summary for the lack of authority to perform the user selected task.

8. A computer-implemented method for implementing dynamic authority as recited in claim 7 includes displaying a confirmation dialog illustrating the analyzed relationship of the target resource to the at least one related resource and identified side effects.

9. A computer-implemented method for implementing dynamic authority as recited in claim 1 wherein the summary includes dialog regarding why the user lacks authority to change the related resource.

10. A computer-implemented method for implementing dynamic authority as recited in claim 1 wherein dynamically determining access to perform the user selected task on the target resource for the user based upon the analyzed relationship of the target resource to the at least one related resource includes identifying side effects of performing the user selected task on the target resource.

11. A computer-implemented method for implementing dynamic authority as recited in claim 1 wherein dynamically determining access to perform the user selected task on the target resource for the user based upon the analyzed relationship of the target resource to the at least one related resource includes denying access for the user and displaying a warning dialog.

12. A computer program product for implementing dynamic authority to perform tasks on a target resource, said computer program product including instructions stored on a non-transitory computer readable storage medium, said instructions when executed by a computer system to cause the computer system to perform the steps of:
    identifying and analyzing a user selected task of the tasks on a target resource to determine whether the user selected task changes a state of the target resource;
    responsive to determining the user selected task changes a state of the target resource, analyzing a relationship of the target resource to at least one related resource; said analyzed relationship of the target resource to the at least one related resource implementing dynamic authority to the user selected task and being selectively based upon destructive weights of the user selected task of the target resource to the at least one related resource; said destructive weights of the user selected task of the target resource to the at least one related resource being selectively based upon recording a history of past times the selected task is run;

dynamically determining access to perform the user selected task on the target resource for the user based upon the analyzed relationship of the target resource to the at least one related resource;

displaying a warning summary for the user when determined the user has authority to change the target resource; and the warning summary displaying dialog of an affect resulting from performing the user selected task on the target resource and the at least one related resource;

performing the user selected task on the target resource.

13. A computer program product for implementing dynamic authority to perform tasks on a resource as recited in claim 12 further includes performing the user selected task, responsive to determining the user selected task does not change a state of the target resource.

14. A computer program product for implementing dynamic authority to perform tasks on a resource as recited in claim 12 wherein dynamically determining access to perform the task on the target resource for the user based upon the analyzed relationship of the target resource to the at least one related resource includes identifying side effects of performing the user selected task on the target resource.

15. A computer program product for implementing dynamic authority to perform tasks on a resource as recited in claim 12 further includes displaying a summary for the user when determined the user lacks authority to change the target resource, said summary including dialog regarding why the user lacks authority to change the related resource.

16. Apparatus for implementing dynamic authority to perform tasks on a target resource comprising:

a processor;

a dynamic task access control program including instructions stored on a non-transitory computer readable storage medium, said processor executing said instructions wherein:

a said dynamic task access control program identifying and analyzing a user selected task of the tasks on a target resource to determine whether the user selected task changes a state of the target resource;

said dynamic task access control program, responsive to determining the user selected task changes a state of the target resource, analyzing a relationship of the target resource to at least one related resource; said analyzed relationship of the target resource to the at least one related resource implementing dynamic authority to the user selected task and being selectively based upon destructive weights of the user selected task of the target resource to the at least one related resource; said destructive weights of the user selected task of the target resource to the at least one related resource being selectively based upon recording a history of past times the selected task is run;

said dynamic task access control program dynamically determining access to perform the user selected task on the target resource for the user based upon the analyzed relationship of the target resource to the at least one related resource; and said dynamic task access control program displaying a warning summary for the user when determined the user has authority to change the target resource; and the warning summary displaying dialog of an affect resulting from performing the user selected task on the target resource and the at least one related resource;

performing the user selected task on the target resource.

17. Apparatus for implementing dynamic authority to perform tasks on a resource as recited in claim 16 wherein said dynamic task access control program dynamically determining access to perform the user selected task of the tasks on the target resource includes said dynamic task access control program determining side-effect of performing the user selected task on the target resource and the at least one related resource.

18. Apparatus for implementing dynamic authority to perform tasks on a resource as recited in claim 16 further includes said dynamic task access control program responsive to the user lacking authority to change another dependent resource, displaying a summary for the lack of authority to perform the user selected task.

* * * * *